United States Patent
Heller et al.

(10) Patent No.: US 9,904,477 B2
(45) Date of Patent: Feb. 27, 2018

(54) SYSTEM AND METHOD FOR STORING LARGE FILES IN A STORAGE DEVICE

(71) Applicant: SanDisk Technologies Inc., Plano, TX (US)

(72) Inventors: Tal Heller, Alonei Abba (IL); Andrew Henry, San Carlos, CA (US); Akiva Bleyer, Even Yehuda (IL); Amir Shaharabany, Kochav Yair (IL)

(73) Assignee: SanDisk Technologies LLC, Plano, TX (US)

( * ) Notice: Subject to any disclaimer, the term of this patent is extended or adjusted under 35 U.S.C. 154(b) by 220 days.

(21) Appl. No.: 14/711,423

(22) Filed: May 13, 2015

(65) Prior Publication Data
US 2016/0335001 A1    Nov. 17, 2016

(51) Int. Cl.
*G06F 13/00* (2006.01)
*G06F 3/06* (2006.01)

(52) U.S. Cl.
CPC .......... *G06F 3/0613* (2013.01); *G06F 3/0653* (2013.01); *G06F 3/0655* (2013.01); *G06F 3/0685* (2013.01); *G06F 3/0688* (2013.01)

(58) Field of Classification Search
CPC .... G06F 3/0613; G06F 3/0688; G06F 3/0653; G06F 3/0685; G06F 3/0655
See application file for complete search history.

(56) References Cited

U.S. PATENT DOCUMENTS

| | | | |
|---|---|---|---|
| 7,427,027 B2 | 9/2008 | Elhamias et al. | |
| 2009/0043831 A1* | 2/2009 | Antonopoulos | G06F 3/0614 |
| 2009/0204746 A1* | 8/2009 | Chen | G06F 12/0246 |
| | | | 711/103 |
| 2010/0278178 A1* | 11/2010 | Sridhar | H04H 20/40 |
| | | | 370/390 |
| 2011/0252187 A1* | 10/2011 | Segal | G06F 12/0246 |
| | | | 711/103 |
| 2012/0131278 A1* | 5/2012 | Chang | G06F 12/0893 |
| | | | 711/118 |
| 2013/0086302 A1* | 4/2013 | Tressler | G06F 3/0679 |
| | | | 711/103 |
| 2015/0268860 A1* | 9/2015 | Yum | G06F 3/061 |
| | | | 711/154 |

* cited by examiner

*Primary Examiner* — Charles Rones
*Assistant Examiner* — Han Doan
(74) *Attorney, Agent, or Firm* — Brinks Gilson & Lione

(57) ABSTRACT

Systems and methods for detecting a file of a predetermined size or greater are disclosed. Files may be downloaded to a storage device via a data stream. The storage device may analyze one or more aspects of the data stream, such as throughput and consistency, in order to determine whether the file is of a predetermined size or greater. In response to determining that the data stream includes a file of at least a predetermined size, the storage device may take one or more actions. One action is to store part or all of the file in a hybrid block, which is a block in non-volatile memory that is accessed (e.g., programmed and/or erased) in a different way than its designation. For example, a block originally designated for multi-level cell (MLC) storage may be programmed for single-level cell (SLC) storage, which is quicker than for MLC. In this way, the storage device may be able to store the downloaded file, with a certain throughput and consistency, without loss of data.

22 Claims, 11 Drawing Sheets

SYSTEM AND METHOD FOR STORING LARGE FILES IN A STORAGE DEVICE

TECHNICAL FIELD

This application relates generally to storage devices. More specifically, this application relates to detecting large files downloaded to the storage device.

BACKGROUND

Various host devices may use a storage device for storage of data within the storage device. One example of a host device is a smartphone, which may download files from a network for storage on the storage device.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1A:
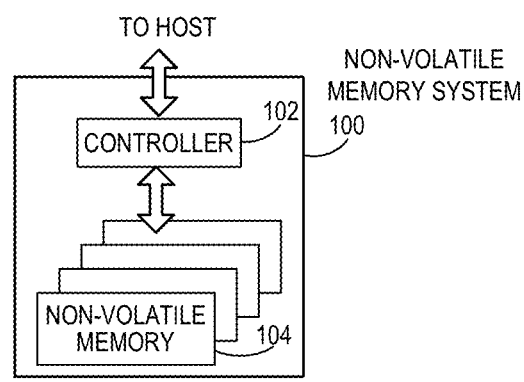
FIG. 1A is a block diagram of an example non-volatile memory system.

A storage device includes memory for storing data therein. For example, the storage device may comprise non-volatile memory, including, for example, NAND flash memory cells (e.g., 2D or 3D structures) and/or NOR flash memory cells. In one embodiment, the memory cells can take the form of solid-state (e.g., flash) memory cells and can be one-time programmable, few-time programmable, or many-time programmable. The memory cells may be assigned to store a predetermined number of bits per cell. For example, a group of memory cells in the storage device may be assigned as single-level cells (SLC), whereby a single bit (logic "0" or logic "1") is stored in a respective cell. As another example, another group of memory cells in the storage device may be assigned as multiple-level cells (MLC), whereby two bits are stored in a respective cell (e.g., logic "00", logic "01", logic "10" and logic "11"). As still another example, a group of memory cells in the storage device may be assigned as triple-level cells (TLC), whereby three bits are stored in a respective cell (e.g., logic "000", logic "001", logic "010", etc.). As yet another example, a group of memory cells in the storage device may be assigned as quadruple-level cells (QLC), whereby four bits are stored in a respective cell (e.g., logic "0000", logic "0001", logic "0010", etc.). SLC, MLC, TLC, QLC are merely examples of the number of bits that may be stored in a respective cell. Greater numbers of bit(s)-per-cell are contemplated. In this regard, use of other memory cell level technologies, now known or later developed, is contemplated.

Each respective bit(s)-per-cell has associated benefits and drawbacks. One evident difference is the number of bits that can be stored in a respective cell, with SLC configured to store a single bit in a respective cell, MLC configured to store two bits in a respective cell, TLC configured to store three bits in a respective cell, QLC configured to store four bits in a respective cell, and so on. Another difference is programming time. Generally speaking, the greater the number of bit(s)-per-cell, the greater the time it takes to program the respective cell. For example, programming a cell for SLC is quicker than MLC, TLC, or QLC. Thus, for purposes of illustration only, SLC can typically be programmed at 100 MB/sec, MLC at 60 MB/sec, and TLC at 30 MB/sec. Still another difference is endurance. Endurance of cells may be measured in one of several ways, such as by program/erase (P/E) cycles. SLC blocks allow a high number of P/E cycles, typically more than 10,000 cycles, whereas MLC blocks provide a smaller number of P/E cycles of about 1000 cycles.

The storage device may typically include at least two of these types of memory. For example, the storage device may include a first number of SLC blocks and a second number of MLC blocks. As another example, the storage device may include a first number of SLC blocks and a second number of TLC blocks. In particular, a storage device may only include 400 MB of SLC and a remainder to MLC. In this way, most of the blocks in the storage device are MLC blocks or TLC blocks, used to store more efficiently compacted data using flash management internal routines transparent to the host device.

There are instances whereby the storage device may need to store very large files. For example, a storage device may work in conjunction with a host mobile device. The host mobile device can use wired and wireless connectivity to transfer big files (such as 500 MB to even 10 GB) that require high bandwidth (BW) for write and read. In those instances, the SLC blocks, used to write host data fast, may not be large enough. For example, where there are only 400 MB of SLC and a file is 500 MB or greater, the big files cannot be stored on SLC blocks since the number of SLC blocks in this pool is not enough for big data chunks.

The storage device may address the big file problem in one of several ways. In one way, the storage device may be configured with a larger number of SLC blocks. In this way, when a big file is downloaded to the storage device, the SLC blocks may be large enough to handle the big file download. However, overprovisioning the storage device with excessive SLC blocks may be inefficient, particularly since downloading big files may occur infrequently.

Another way to address the big file problem is for the storage device to first detect whether a big file is being received by the storage device, and to modify its operation in response to the detection of the big file. In this regard, in one embodiment, the storage device analyzes the incoming data stream in order to identify certain characteristics in the data stream. Examples of characteristics include, without limitation, bandwidth and/or consistency. Based on the identified characteristics, the storage device may determine the contents of the data stream, such as whether the data stream includes a file of a certain size or greater. For example, the storage device may analyze the throughput of the incoming data stream to determine whether the throughput is greater than a predetermined amount per predetermined time period. Throughput is an example of bandwidth and may be measured as the amount of data in the data stream measured relative to time. As another example, the consistency of the data stream, such as an amount of time that the data stream exhibits certain characteristics, may be analyzed.

The storage device may analyze the bandwidth and/or the consistency in order to determine whether the data stream includes a large file. For example, the storage device may analyze throughput to determine whether the throughput is greater than a throughput threshold. As discussed in more detail below with respect to FIG. 7B, the throughput may be compared against a throughput threshold of 40 MB/second. As another example, the storage device may analyze the incoming data stream to determine whether the data stream exhibits a certain characteristic (such as a throughput greater than the throughput threshold) for at least a certain period of time (such as greater than 1 second).

The storage device, in one embodiment, may analyze one or more aspects of the incoming data stream (such as the bandwidth and/or the consistency of the data stream) entirely independently of the host device in order to determine whether a large file is present. In an alternative embodiment, the storage device receives from the host device an indication as to whether a large file is present in the incoming data stream. The indication may comprise host device hints or host commands. In response to receiving the indication, the storage device may determine that a large file is present in the incoming data stream. In a first alternate embodiment, the storage device solely analyzes the indication from the host device in order to determine that a large file is present in the incoming data stream. In a second alternate embodiment, the storage device analyzes the indication from the host device and analyzes the data stream for one or more characteristics (such as bandwidth and consistency) in order to determine that a large file is present in the incoming data stream.

As discussed above, in response to detecting the big file (e.g., as exhibited by the data stream having certain characteristics), the storage device may modify its operation. In one embodiment, in response to detecting an event, the storage device may write to hybrid blocks. A hybrid block is a block in non-volatile memory that is accessed (e.g., programmed and/or erased) in a different way than its designation. For example, blocks in the storage device may be designated as, originally intended for, or previously written as a specific bit(s)-per-cell, such as SLC, MLC, TLC, QLC, etc. More specifically, in programming a block for SLC when the block was originally intended for MLC, a different programming methodology to program for SLC is used than for MLC. As another example, different erasing methodologies may be used depending on the programming of the block, whereby the cell is connected to the Vt at which the cell was programmed originally. In particular, when erasing a block programmed for MLC, the Vt at which the block was programmed for MLC is used for the erase. Likewise, when erasing a block programmed for LLC, the Vt at which the block was programmed for SLC is used for the erase.

One example of an event is detecting a big file. Thus, in a specific embodiment, in response to detecting a big file, the storage device may write to a hybrid block. In particular, when faced with a dearth of SLC blocks (such as due to the receipt of a big file), the storage device may use MLC block(s), TLC block(s) or QLC block(s) as SLC blocks, treating these MLC blocks, TLC blocks or QLC blocks as hybrid blocks (e.g., part of the time programming the blocks as MLC blocks and, during a big file download, as SLC blocks). The storage device using hybrid blocks may have drawbacks. For example, treating an MLC block as an SLC block wears out the MLC block quicker, effectively shortening the useful life of the MLC block. In this regard, the use of hybrid blocks may be in response to detecting a specific event, such as detecting a big file. Events, other than detecting a big file, are contemplated. Thus, writing to hybrid blocks may be in response to one or more types of detected events.

In still an alternate embodiment, in response to determining that a large file is being downloaded to the storage device, the storage device may determine the bit(s)-per-cell at which to store in the hybrid blocks. For example, in a storage device that includes SLC blocks and TLC blocks, the storage device may determine that a large file is being downloaded, thereby necessitating the use of some TLC blocks as hybrid blocks. However, in using TLC blocks as hybrid blocks, the TLC blocks may in one embodiment be used as SLC blocks and in an alternate embodiment as MLC blocks. As discussed above, SLC may typically be programmed at 100 MB/sec, MLC at 60 MB/sec, and TLC at 30 MB/sec. In this regard, the storage device may analyze the data stream for the bandwidth, and determine, based on the bandwidth, whether to use the TLC blocks as SLC blocks or as MLC blocks. For example, in response to determining that the bandwidth for the data stream is 80 MB/sec (one example of throughput), the data storage device may program the TLC blocks as SLC blocks (since SLC blocks can be programmed at 100 MB/sec). As another example, in response to determining that the bandwidth for the data stream is 50 MB/sec, the data storage device may program the TLC blocks as MLC blocks (since MLC blocks can be programmed at 60 MB/sec).

Thus, according to one aspect, a method for a storage device to detect a file of at least a predetermined size is disclosed. The method is performed in the storage device and includes: receiving a data stream; analyzing one or both of bandwidth and consistency of the data stream; and based on the analysis, determining whether the data stream includes a file of at least a predetermined size.

According to another aspect, a storage device is disclosed. The storage device includes: a data stream receiving module configured to receive an incoming data stream from a host device; a data stream analyzing module configured to analyze one or both of bandwidth and consistency of the incoming data stream; and a file size determination module configured to determine, based at least in part on the analysis of the incoming data stream, whether the incoming data stream includes a file of at least a predetermined size.

According to yet another aspect, a method for a storage device to determine whether to write to a section of memory comprised of cells at a bit(s)-per-cell different from a designated bit(s)-per-cell for the section of memory is disclosed. The method is performed in the storage device and includes: receiving a data stream; determining whether to write to the section of memory at the bit(s)-per-cell different from the designated bit(s)-per-cell; in response to determining to write to the section of memory at the bit(s)-per-cell different from the designated bit(s)-per-cell, writing to the section of memory at the bit(s)-per-cell different from the designated bit(s)-per-cell; and in response to determining to write to the section of memory at the designated bit(s)-per-cell, writing to the section of memory at the designated bit(s)-per-cell.

According to still another aspect, a storage device is disclosed. The storage device includes: a memory comprising a first section of memory and configured for storage at a first bit(s)-per-cell and a second section of memory configured for storage at a second bit(s)-per-cell, the first bit(s)-per-cell being different than the second bit(s)-per-cell; a data stream receiving module configured to receive an incoming data stream from a host device; a data stream analyzing module configured to analyze at least a part of the incoming data stream; and a memory section determination module configured to determine, based at least in part on the analysis of the incoming data stream, whether to store part or all of the incoming data stream in the second section of memory at a bit(s)-per-cell different from the second bit(s)-per-cell.

Referring to the figures, FIG. 1A is a block diagram illustrating a non-volatile memory system. The non-volatile memory system 100 includes a controller 102 and non-volatile memory that may be made up of one or more non-volatile memory die 104. One or both of the controller 102 and non-volatile memory die 104 may use a regulated voltage. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may in one embodiment be a flash memory controller) can take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. For example, the hardware and/or firmware may be configured for analysis of the incoming data stream (such as for bandwidth and/or consistency) and for determination whether to use hybrid blocks, as discussed in more detail below. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. One example of non-volatile memory die 104 may comprise a memory integrated circuit chip. The memory cells can take the form of solid-state (e.g., flash) memory cells and can be one-time programmable, few-time programmable, or many-time programmable. As discussed above, the memory cells can also be single-level cells (SLC), multiple-level cells (MLC), triple-level cells (TLC), quadruple-level cells (QLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system, examples of which include, without limitation, embedded MMC (eMMC), universal flash storage (UFS), peripheral component interface express (PCIe), or a solid state drive (SSD), discussed below.

Although in the example illustrated in FIG. 1A non-volatile memory system 100 includes a single channel between controller 102 and non-volatile memory die 104, the subject matter described herein is not limited to having a single memory channel. For example, in some NAND memory system architectures such as illustrated in FIGS. 1B-C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
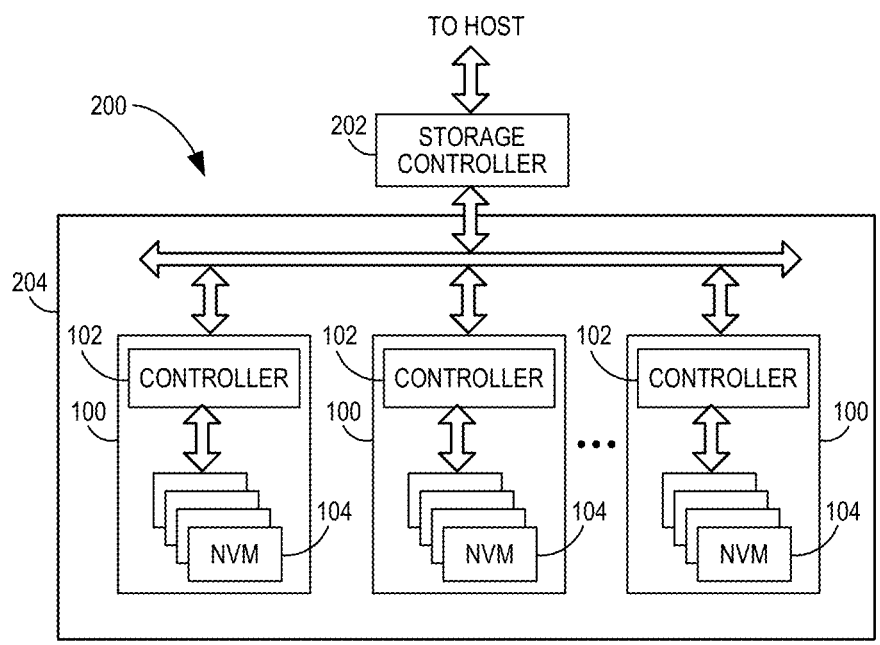
FIG. 1B is a block diagram illustrating an exemplary storage module.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA), eMMC, UFS, or PCIe interface. Storage module 200, in one embodiment, may be a solid state drive (SSD), such as found in portable computing devices, such as laptop computers, and tablet computers.

Figure 1C:
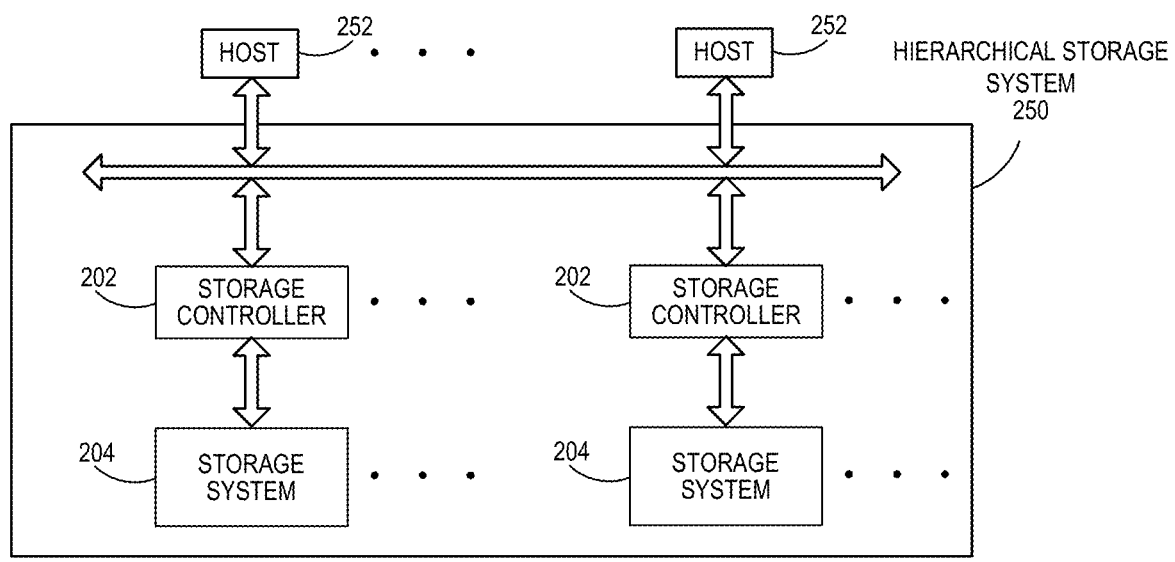
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
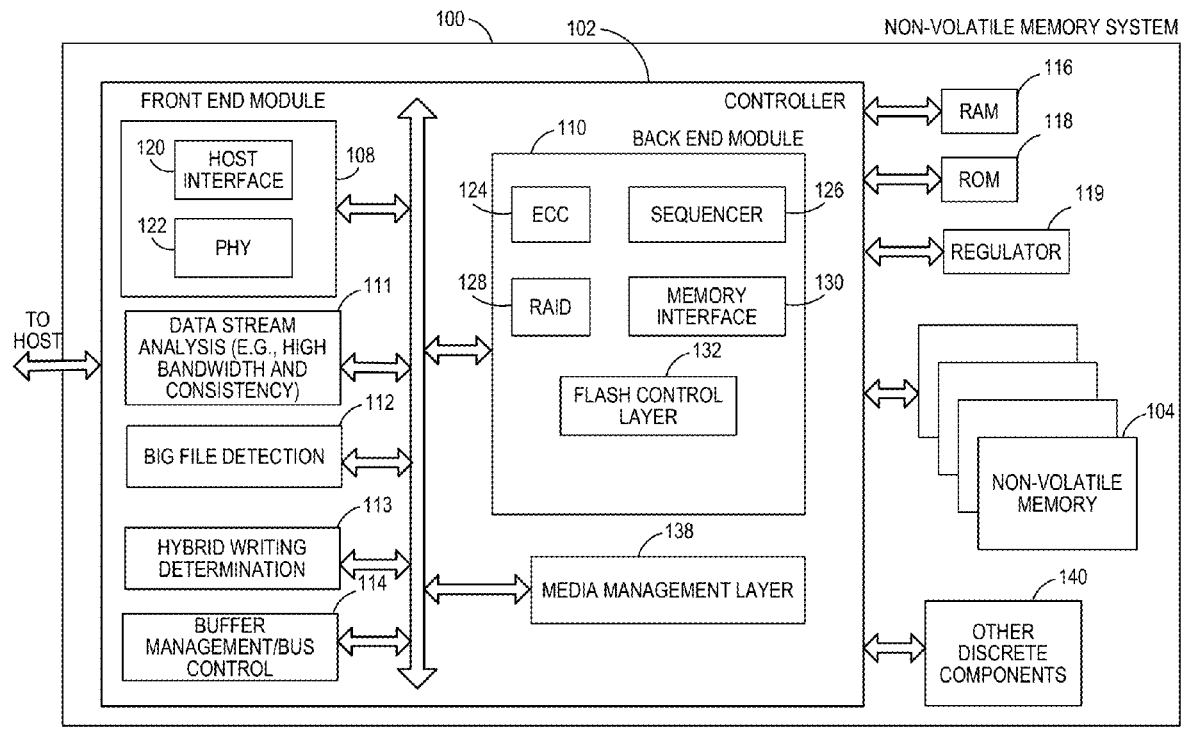
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a data stream analysis module 111, a big file detection module 112, and a hybrid writing determination module 113. As explained in more detail below, the data stream analysis module 111 may analyze a data stream (such as a data stream from the host device) for one or more characteristics, such as bandwidth and/or consistency. The big file detection module 112 may analyze the one or more characteristics in order to determine whether the data stream includes a big file (e.g., a file that has a throughput greater than a predetermined amount/predetermined time period and for a greater than a predetermined time). The hybrid writing determination module 113 is configured to determine whether to write to one or more hybrid blocks. In one embodiment, the hybrid writing determination module 113 may analyze the one or more characteristics determined by the data stream analysis module 111 in order to determine whether to write to one or more hybrid blocks. In an alternate embodiment, in response to the big file detection module 112 detecting a big file, the hybrid writing determination module 113 may determine to write to one or more hybrid blocks.

While in some implementations the data stream analysis module 111, the big file detection module 112, and the hybrid writing determination module 113 may be part of the controller 102, in other implementations, all or a portion of the data stream analysis module 111, the big file detection module 112, and the hybrid writing determination module 113 may be discrete components, separate from the controller 102, that interface with the controller 102. For example, the big file detection module 112 and the hybrid writing determination module 113 may be included in controller 102 whereas the data stream analysis module 111 may be separate from, and provide the digital representation as an input to, controller 102.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, eMMC, UFS, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
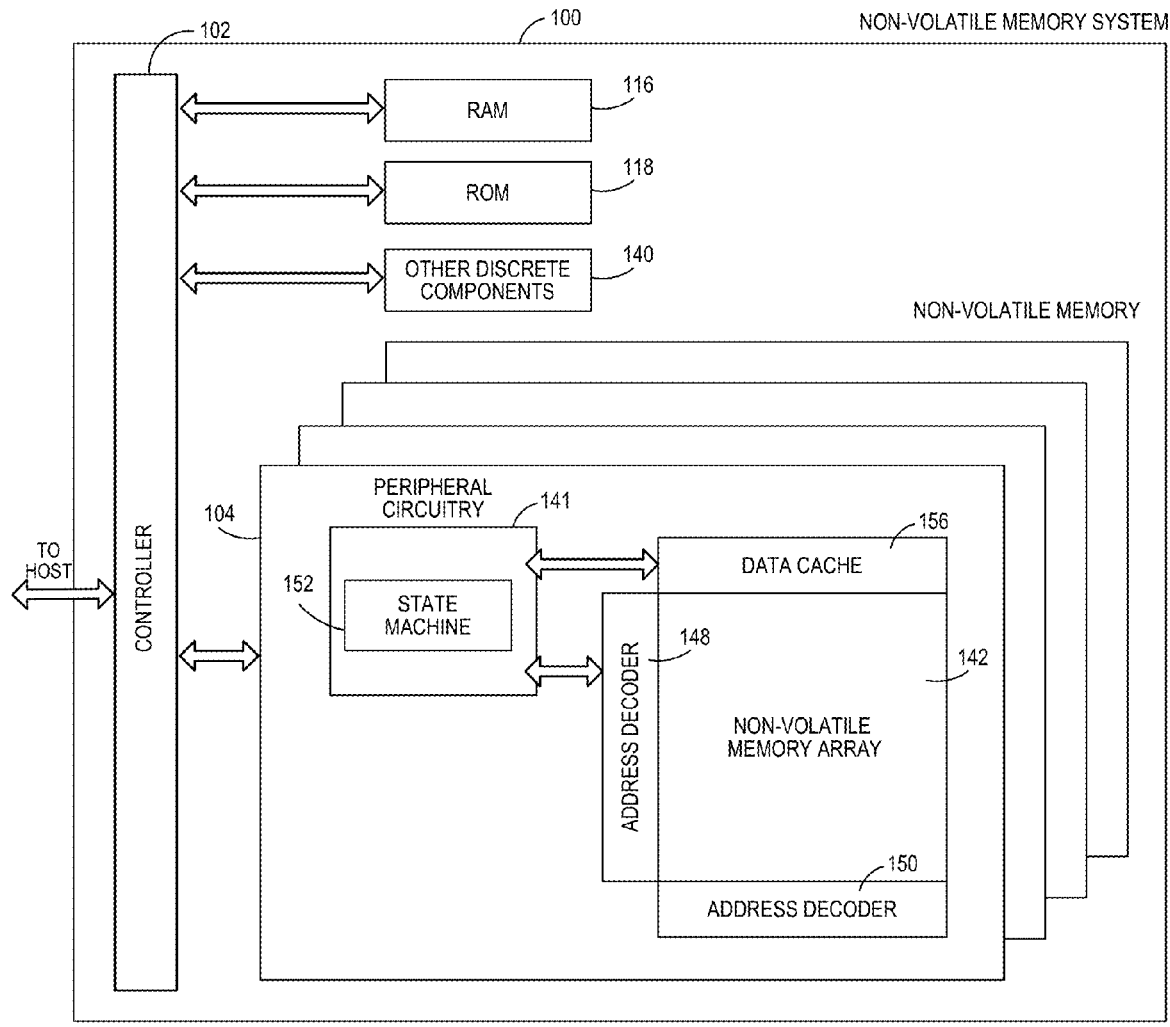
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes address decoders 148, 150 for addressing within non-volatile memory array 142, and a data cache 156 that caches data.

Figure 3:
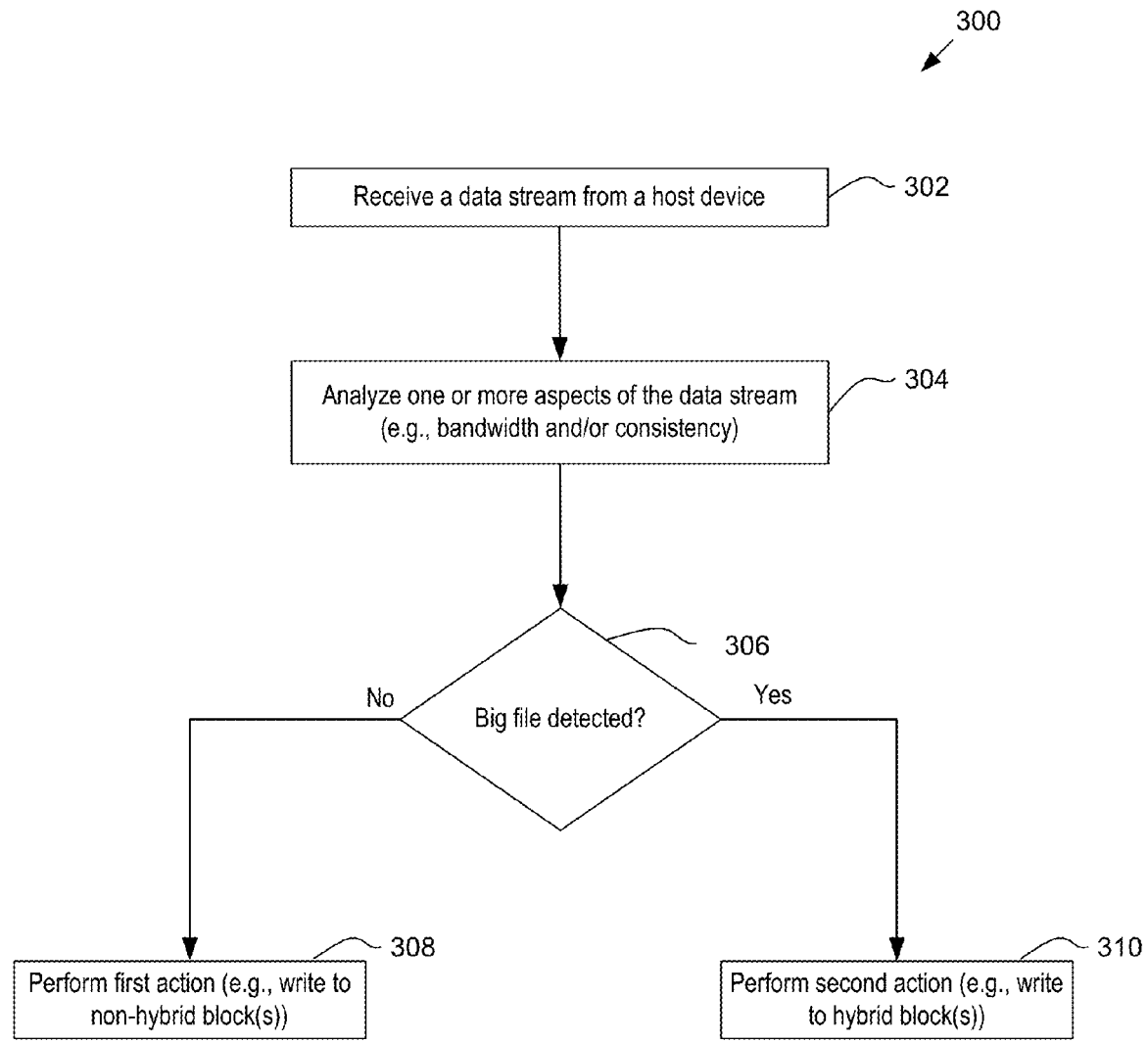
FIG. 3 illustrates a first flow chart for detecting whether a big file is in the data stream.

FIG. 3 illustrates a first flow chart 300 for detecting whether a big file is in the data stream. At 302, the storage device receives a data stream from the host device. At 304, the storage device may analyze one or more aspects of the data stream. As discussed above, the analysis by the storage device may, in one embodiment, be independent of the host device, or may, in an alternate embodiment, be dependent on commands or hints sent from the host device. Examples of aspects of the data stream include, but are not limited to, bandwidth and consistency. Further, examples of data streams subject to analysis are illustrated in FIGS. 7A-B.

Figure 7A:
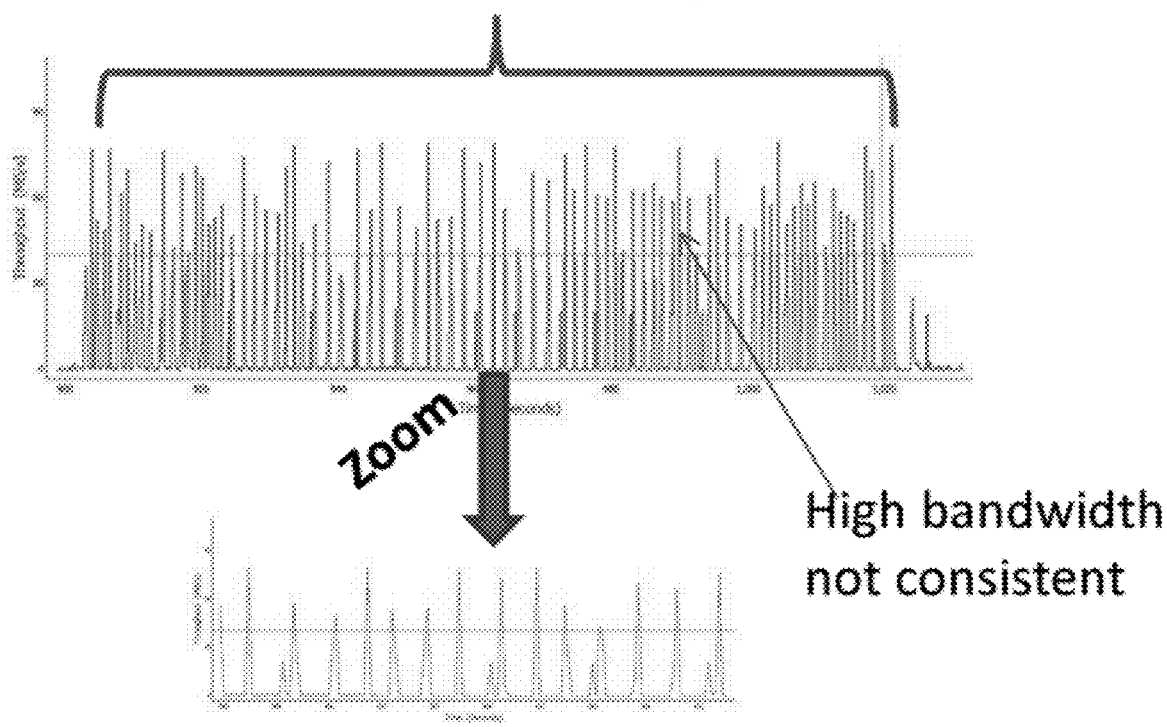
FIG. 7A illustrates a graph of time versus throughput for an app downloaded via Wi-Fi.
Figure 7B:
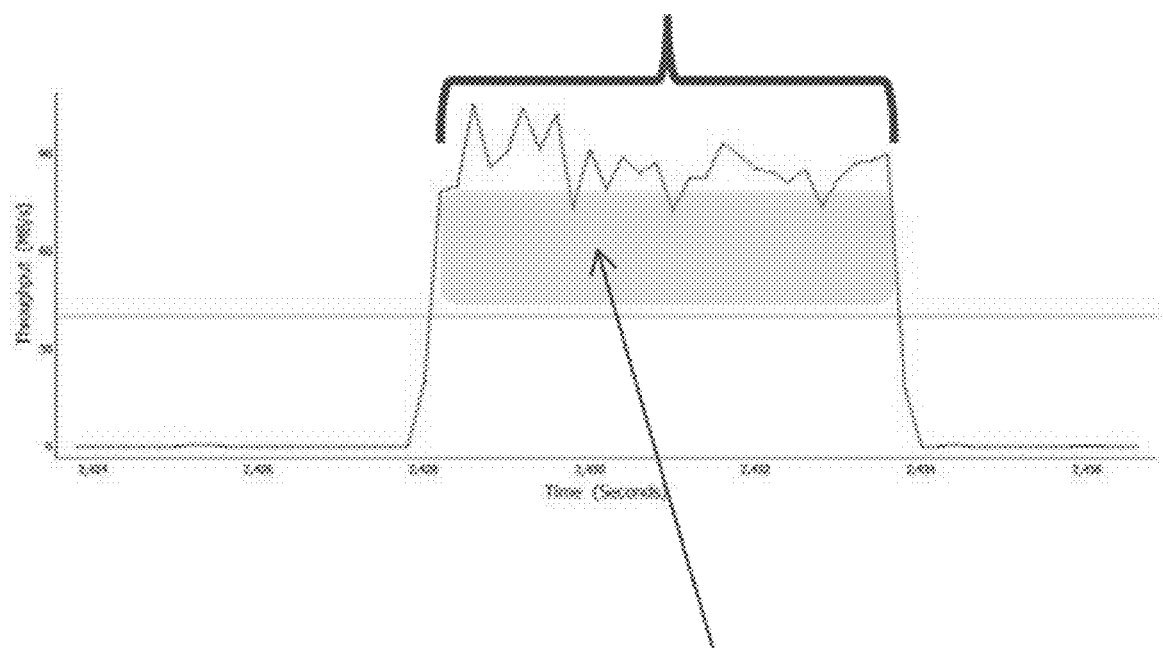
FIG. 7B illustrates a graph of time versus throughput for a file downloaded via USB3.

In particular, FIG. 7A illustrates a graph of time (in seconds) versus throughput (in MB/sec) for a file downloaded via Wi-Fi and FIG. 7B illustrates a graph of time (in seconds) versus throughput (in MB/sec) for a file downloaded via USB3. The inset in FIG. 7A illustrates a zoom of one of a set of peaks. FIG. 7A illustrates a data stream with high bandwidth, as illustrated with peaks greater than a predetermined amount (illustrated in FIG. 7A as the horizontal line of 40 MB/s). However, FIG. 7A illustrates that the download is not consistent. Consistency may be measured in one of several ways. In one way, consistency may be measured as being at least a certain amount of time, such as at least 1 second or greater, two seconds or greater, or the like. Thus, FIG. 7A illustrates bursts that include latencies between the bursts. As discussed in more detail below, the pattern exhibited in FIG. 7A is an example where a big file is not detected.

FIG. 7B, in contrast to FIG. 7A, illustrates a continuous high BW data transfer related to a big file. More specifically, the throughput (as illustrated in MB/s) is consistently greater than a predetermined amount/predetermined time period (such as 40 MB/s, as illustrated by the horizontal line in FIG. 7B). Further, the data stream is consistently high, over the course of approximately 6 seconds. In this way, the data stream, as illustrated in FIG. 7B, exhibits characteristics of both high bandwidth (greater than a predetermined amount) and consistency (e.g., greater than 1 second of high bandwidth). As discussed in more detail below, the continuous high BW data transfer illustrated in FIG. 7B may be detected by the flash controller backend FW.

FIGS. 7A-B are examples of different data streams that exhibit certain characteristics indicative of a large file. Other data streams with different characteristics are contemplated. In this regard, the detection of a large file is not limited merely to the characteristics as exhibited in FIG. 7B. Rather, FIGS. 7A-B are merely used as examples for which the methodology for the hybrid block determination may be applied.

At 306, it is determined whether a big file is detected. As discussed above, predetermined characteristics (such as a certain bandwidth and consistency) of the data stream indicate a big file. In response to not detecting the predetermined characteristics in the data stream, at 308 a first action may be performed. One such action is to write to non-hybrid blocks, as discussed in more detail below. In response to detecting the predetermined characteristics in the data stream, at 310 a second action may be performed. One such action is to write to hybrid blocks, as discussed in more detail below.

Figure 4:
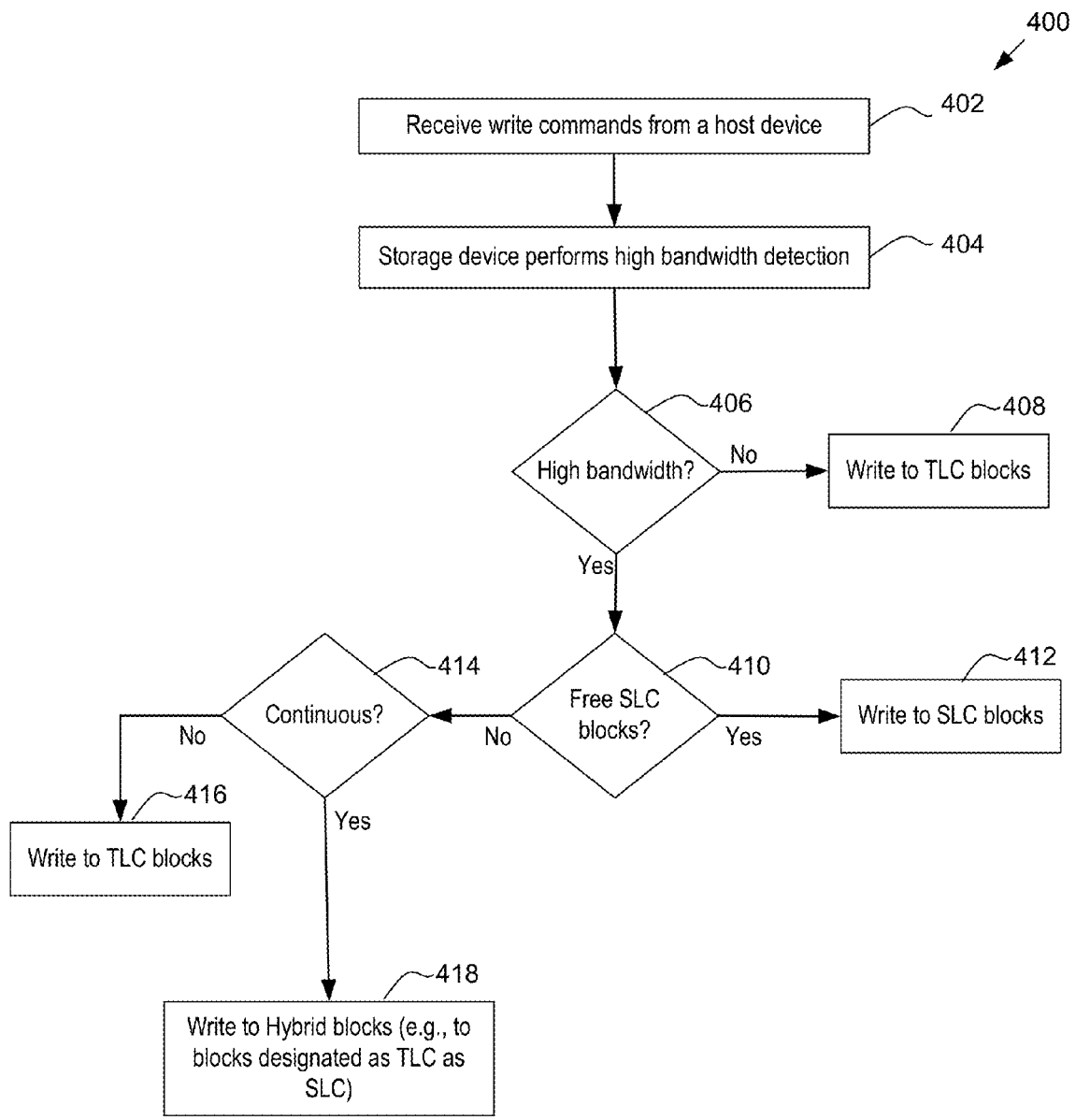
FIG. 4 illustrates a second flow chart for detecting whether a big file is in the data stream.

FIG. 4 illustrates a second flow chart 400 for detecting whether a big file is in the data stream. More specifically, FIG. 4 illustrates an optimal performance method for storing big files. At 402, write commands are received from the host device. At 404, the storage device performs high bandwidth detection. For example, the storage device may determine the bandwidth of the incoming write commands and compare the determined bandwidth with a predetermined threshold (such as 40 MB/s). At 406, it is determined whether the data stream indicates a high bandwidth. One example of this is where the throughput determined for the data stream is greater than a throughput threshold. FIG. 7B illustrates one example of a throughput threshold of 40 MB/second. Other throughput thresholds are contemplated. In response to determining that the write commands are not high bandwidth, at 408, the incoming data is written to TLC blocks. More specifically, since the write commands are not high bandwidth, a slower write method, such as writing TLC to the TLC blocks, may be used.

In response to determining that the write commands are high bandwidth, at 410, it is determined whether there are free SLC blocks. If it is determined that there are free SLC blocks, at 412, the incoming data is written to the free SLC blocks. If it is determined that there are no free SLC blocks, at 414, the storage device determines whether the incoming data is continuous. As discussed above, continuous may be determined by comparing an amount of time that the incoming data is at high bandwidth (e.g., greater than a predetermined amount of time, such as 1 second). If it is determined that the incoming data is continuous, at 418, the incoming data is written to hybrid blocks. In this regard, two indicators of a large file, with the determination at 406 of high bandwidth and the determination of continuous at 414, results in the use of hybrid blocks. Thus, the big file detection may be performed by detecting continuous high BW stream of more than 40 MB/sec rate and lasting, for example, for 1-12 seconds.

If it is determined that the incoming data is not continuous, at 416, the incoming data is written to TLC blocks. Thus, determining that the incoming data is not continuous (meaning that the incoming data may be indicative of a momentary burst), indicates that the incoming data may be stored via a slower storage method, such as in TLC blocks.

Figure 5:
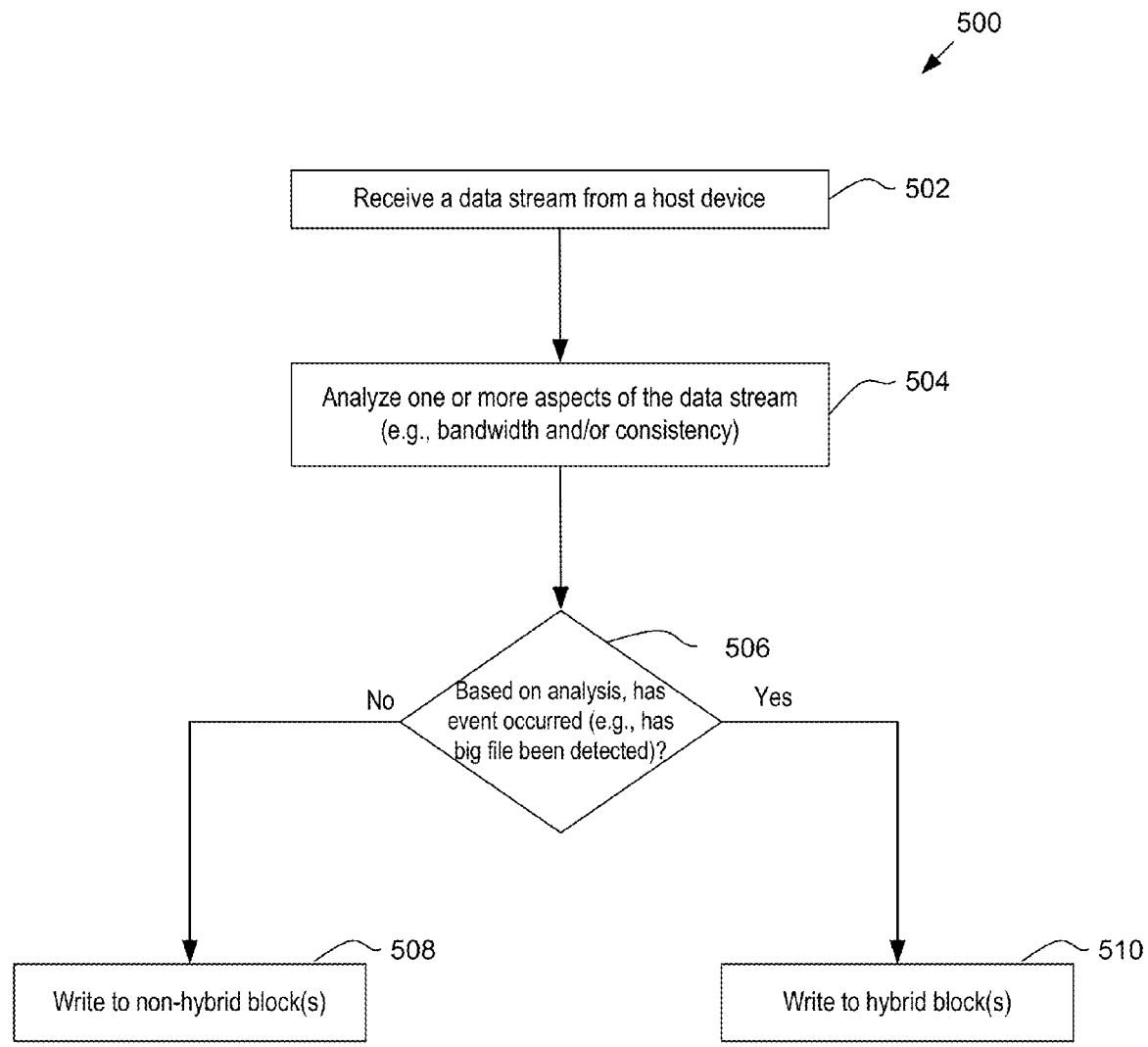
FIG. 5 illustrates a flow chart for determining whether to write data to a hybrid block.

FIG. 5 illustrates a flow chart 500 for determining whether to write data to a hybrid block. At 502, the storage device receives a data stream from the host device. At 504, the storage device may analyze one or more aspects of the data stream. The analysis by the storage device may, in one embodiment, be independent of the host device, or may, in an alternate embodiment, be dependent on commands or hints sent from the host device. At 506, based on the analysis, it is determined whether an event has occurred. One example of an event is the detection of a big file. In one embodiment, in response to detecting a big file (e.g., the data stream is both high bandwidth and consistent), at 510, it is determined to write to hybrid blocks.

As discussed above, one example of writing to a hybrid block is to write a single level (e.g., SLC data) to cells in a MLC block. Further, in response to not detecting a big file (e.g., the data stream is not both high bandwidth and consistent), at 508, at least a part of the data stream is written to non-hybrid blocks. Examples of writing to non-hybrid blocks include writing a single level to cells in an SLC block, or writing multi-level cell data to an MLC block.

Figure 6:
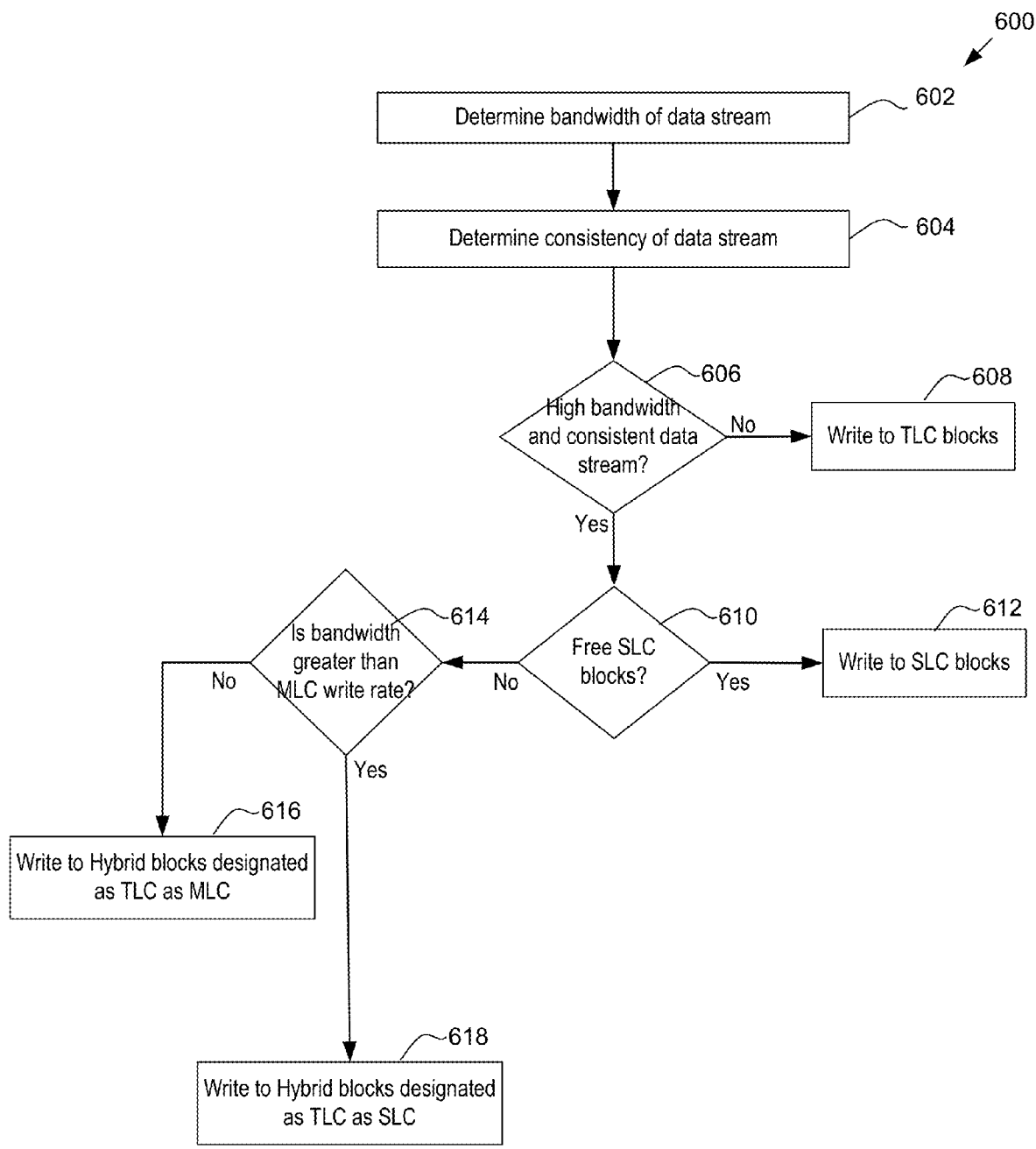
FIG. 6 illustrates a flow chart for selecting a bit(s)-per-cell rate at which to store data.

FIG. 6 illustrates a flow chart 600 for selecting a bit(s)-per-cell rate at which to store data. For a storage device with TLC blocks (or higher bits-per-cell blocks), there are multiple options as to writing to hybrid blocks. For example, with TLC blocks, the data may be written as SLC to the TLC blocks. As another example, the data may be written as MLC to the TLC blocks. In this regard, the data may be written in SLC or MLC depending on the specifics of the data stream, as described in more detail below.

At 602, the bandwidth of the data stream is determined. At 604, the consistency of the data stream is determined. FIG. 6 illustrates that the bandwidth of the data stream is determined and then the consistency of the data stream is determined. Alternatively, the consistency of the data stream may be determined prior to the bandwidth of the data stream.

At 606, it is determined whether the data stream is both high bandwidth and consistent (indicating that the data stream includes a large file). If it is not consistent and high bandwidth, at 608, the data is written to TLC blocks. If the data stream is both consistent and high bandwidth, at 610, it is determined whether there are free SLC blocks. If so, at 612, the data is written to the free SLC blocks. If not, the bandwidth rate is analyzed. In particular, at 614, the bandwidth is compared with the MLC write rate. If the bandwidth is greater than the MLC write rate, at 618, the data is written as SLC data to hybrid blocks.

In the present application, semiconductor memory systems such as those described in the present application may include volatile memory systems, such as dynamic random access memory ("DRAM") or static random access memory ("SRAM") devices, non-volatile memory systems, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory system may have different configurations. For example, flash memory systems may be configured in a NAND or a NOR configuration.

The memory systems can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory system elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory systems in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory system level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory system level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory system levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory system levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory system levels. Alternatively, the memory elements may be coupled together to form a vertical NAND string that traverses across multiple horizontal memory system levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory system levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory system level of the array are typically formed on the layers of the underlying memory system levels of the array. However, layers of adjacent memory system levels of a monolithic three dimensional memory array may be shared or have intervening layers between memory system levels.

Then again, two dimensional arrays may be formed separately and then packaged together to form a non-monolithic memory system having multiple layers of memory. For example, non-monolithic stacked memories can be constructed by forming memory levels on separate substrates and then stacking the memory levels atop each other. The substrates may be thinned or removed from the memory system levels before stacking, but as the memory system levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory system.

Associated circuitry is typically required for operation of the memory elements and for communication with the memory elements. As non-limiting examples, memory systems may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method comprising:
performing in a storage device:
receiving a data stream;
analyzing one or both of bandwidth and consistency of the data stream;
determining whether the bandwidth of the data stream exceeds a predetermined amount; and
in response to determining that the bandwidth of the data stream exceeds the predetermined amount:
determining whether blocks designated for programming with a single bit per cell are available for programming; and
in response to determining that the blocks designated for programming with the single bit per cell are not available:
selecting one or more hybrid blocks of non-volatile memory in the storage device, the one or more hybrid blocks being previously programmed by the storage device with more than the single bit per cell; and
programming the one or more hybrid blocks with the single bit per cell.

2. The method of claim 1, further comprising determining a throughput of the data stream, the throughput being a measure of an amount of data in the data stream received by the storage device relative to an amount of time; and
wherein analyzing the data stream comprises determining whether the throughput of the data stream exceeds a throughput threshold.

3. The method of claim 2, wherein analyzing consistency of the data stream comprises determining whether the throughput exceeds the throughput threshold for at least a predetermined time period.

4. A storage device comprising:
data stream receiving circuitry configured to receive an incoming data stream from a host device;
data stream analyzing circuitry configured to analyze one or both of bandwidth and consistency of the incoming data stream;
file size determination circuitry configured to determine, based at least in part on the analysis of the incoming data stream, whether the incoming data stream includes a file of at least a predetermined size; and
memory selection and programming circuitry configured to:
in response to determining that the incoming data stream includes a file of at least the predetermined size:
select a hybrid section of non-volatile memory in the storage device previously programmed by the storage device with a first number of bits per cell; and
program the hybrid section of non-volatile memory in the storage device with a second number of bits per cell, the second number of bits being different than the first number of bits per cell; and
in response to determining that the incoming data stream does not include a file of at least the predetermined size:
select a non-hybrid section of non-volatile memory in the storage device previously programmed by the storage device with the second number of bits per cell; and
program the non-hybrid section of non-volatile memory in the storage device with the second number of bits per cell.

5. The storage device of claim 4, wherein the data stream analyzing circuitry is configured to analyze throughput of the incoming data stream, the throughput being a measure of an amount of data in the data stream received by the storage device relative to an amount of time; and
wherein the file size determination circuitry is configured to determine whether the throughput of the data stream exceeds a throughput threshold.

6. The storage device of claim 5, wherein the file size determination circuitry is further configured to determine whether the throughput of the data stream exceeds the throughput threshold for at least a predetermined time.

7. A method for a storage device to determine whether to write to a hybrid section of memory comprised of cells at a bits-per-cell different from a designated bits-per-cell for the hybrid section of memory, the method comprising:
performing in the storage device:
receiving a data stream;
determining whether the data stream includes a file of a certain size or greater;
in response to determining that the data stream includes the file of the certain size or greater:
programming to the hybrid section of memory at the different one or more bits-per-cell; and
in response to determining that the data stream does not include a file of the certain size or greater:
programming to a non-hybrid section of memory.

8. The method of claim 7, wherein the storage device determines whether the data stream includes the file of the certain size or greater based on analysis from a host device.

9. The method of claim 7, wherein the storage device determines whether the data stream includes the file of the certain size or greater based on the storage device analyzing the data stream independently of a host device.

10. The method of claim 9, wherein analyzing, by the storage device, the data stream independently of the host device comprises analyzing bandwidth of the data stream.

11. The method of claim 9, wherein analyzing, by the storage device, the data stream independently of the host device comprises analyzing consistency of the data stream.

12. The method of claim 9, wherein analyzing, by the storage device, the data stream independently of the host device comprises analyzing bandwidth and consistency of the data stream; and
in response to determining that the data stream has a bandwidth greater than a predetermined amount and a consistency greater than a predetermined time, determining that the data stream includes the file of the certain size or greater.

13. A storage device comprising:
a memory comprising a hybrid section of memory designated for storage at a first bits-per-cell;
data stream receiving circuitry configured to receive an incoming data stream from a host device;

data stream analyzing circuitry configured to analyze at least a part of the incoming data stream for bandwidth;

memory section determination circuitry configured to determine, based on the bandwidth of the incoming data stream, whether to write part or all of the incoming data stream in the hybrid section of memory;

bit-per-cell selection circuitry configured to select, based on the bandwidth of the incoming data stream, a hybrid one or more bits-per cell, the hybrid one or more bits-per cell being selected from a plurality one or more bits-per cell different from the first bits-per-cell; and programming circuitry configured to program the hybrid section of memory at the selected hybrid one or more bits-per cell.

14. The storage device of claim 13, wherein the data stream analyzing circuitry is configured to analyze the incoming data stream independently of the host device.

15. The storage device of claim 13, wherein the memory section determination circuitry is configured to determine whether to store part or all of the incoming data stream in the second section of memory at the first one or more bits-per-cell.

16. The storage device of claim 13, wherein the data stream analyzing circuitry is configured to analyze the incoming data stream for bandwidth and consistency.

17. The storage device of claim 13, wherein the memory section determination circuitry is configured to determine, independently of the host device, whether to store part or all of the incoming data stream in the second section of memory at the different one or more bits-per-cell than the second bits-per-cell.

18. The storage device of claim 13, further comprising bits-per-cell selection circuitry configured to select, from a plurality of bits-per-cell options, a hybrid bits-per-cell at which to store the part or all of the incoming data stream.

19. The storage device of claim 18, wherein the data stream analyzing circuitry is configured to analyze bandwidth of the incoming data stream; and wherein the bits-per-cell selection circuitry is configured to select the hybrid bits-per-cell at which to store the part or all of the incoming data stream based on the bandwidth of the incoming data stream.

20. The method of claim 1, further comprising determining whether the data stream is continuous; and in response to determining that the blocks designated for programming with the single bit per cell are not available and the data stream is continuous, selecting the one or more hybrid blocks for programming with the single bit per cell.

21. The storage device of claim 13, wherein the first bits-per-cell comprises three bits-per-cell; and wherein the hybrid one or more bits-per-cell are selected from one bit-per-cell or two bits-per-cell.

22. The storage device of claim 21, wherein the bit-per-cell selection circuitry configured to select the hybrid one or more bits-per cell based on the bandwidth of the incoming data stream by:

in response to determining that the bandwidth exceeds a predetermined amount, select the one bit-per-cell; and in response to determining that the bandwidth does not exceed the predetermined amount, select the two bits-per-cell.

* * * * *